United States Patent Office 3,295,995
Patented Jan. 3, 1967

3,295,995
PROCESS OF DEHYDRATING VEGETABLES
Willard M. Bright, Ridgewood, Morton Pader, Teaneck, and Wilfried Wiesner, Rutherford, N.J., assignors to Lever Brothers Company, New York, N.Y., a corporation of Maine
No Drawing. Filed Feb. 25, 1963, Ser. No. 260,906
7 Claims. (Cl. 99—204)

This invention relates to a method for dehydrating vegetables. More particularly, it is concerned with the dehydrated product therefrom.

It is known to dehydrate vegetables, such as carrot dice. However, dehydrated carrot dice of substantial dimensions, e.g., ⅜ inch on a side, prepared in accordance with prior art procedures have required prolonged cooking. i.e., 30 minutes or longer, for complete rehydration. This prolonged cooking is undesirable.

It is also known to prepare dehydrated carrot flakes by peeling and slicing carrots; precooking the sliced carrots in water; partially drying subsequently at low temperatures, e.g., 135 to 140° F.; and rolling the partially dried carrots into a flattened, flake-like form with further drying thereafter (U.S. Patent No. 1,272,266). Furthermore, powdered carrots may be formed by heating thin slices of carrots until they are dry; passing the dehydrated slices through a breaking roller to form small particles; and then grinding the small particles into granulated form (U.S. Patent No. 2,192,041). However, these procedures have certain disadvantages; for example, the carrot flakes or powdered carrots therefrom will not reconstitute to a size or texture comparable to those of the original carrot slice.

In the past (U.S. Patent No. 2,901,359), apple pieces were dehydrated to a low moisture content, e.g., 18%, at temperatures up to 170° F. with an undesirable case-hardening. The substantially dehydrated apple pieces were then flattened by a roller to compress or partially crush their inner cellular structures and to tear the tough outer layers thereby exposing, at least partially, the inner cellular structures. However, this technique showed no advantage when applied to carrot dice and the products obtained rehydrated no better than the other dehydrated carrot dice prepared heretofore.

It has now been discovered that a new dehydrated vegetable piece may be formed which does not have the aforementioned disadvantages of the prior art products. Thus, in accordance with this invention, a root vegetable is prepared for dehydration, including the step of cutting to the desired size and shape. The prepared vegetable is heated to case-harden the exterior surface. During case-hardening, a differential moisture content is formed between the exterior surface and interior portion of the prepared vegetable. It is also important for the prepared, case-hardened vegetable to have an average moisture content of at least about 40%. The prepared, case-hardened vegetable which is also partially dehydrated is then treated, e.g., crushed, to mash the interior portion without damaging substantially the exterior surface except for at least one perforation therein. The resulting piece formed by the aforementioned case-hardening and treating is dried further to provide a hollow, dehydrated vegetable piece, such as dehydrated carrot dice.

Any root vegetable is applicable to the present invention. The terminology "root vegetable" defines a well-known class of plants having edible roots and includes, among other vegetables, carrots, turnips, white potatoes, and sweet potatoes.

For the purpose of convenience, this invention may be described in terms of carrot dice. However, ti is understood that the description is generally applicable to other root vegetables and is generally applicable to other forms of dehydrated pieces.

The preparation for dehydration may vary according to the root vegetable being prepared. The conventional steps in the preparation are peeling, washing, cutting, sulfiting and blanching. It is necessary, however, to cut the vegetable to a size sufficient to provide a dehydrated piece, e.g., dice or julienne strips. This cutting may be performed commercially by machines that are adaptable to receive dies to form the desired sizes. For example, there are dies to cut vegetables into diced pieces which are ⅜ inch, ½ inch, ⅝ inch or ¾ inch cubes and there are dies to cut the vegetables into julienne pieces which are 3/16 inch x ¼ inch strips or ¼ inch x ¼ inch strips.

Sulfiting is the known procedure of treating vegetables with an aqueous solution of sodium bisulphite, sulfur dioxide, aqueous sulfurous acid, etc. This procedure preserves the flavor of the vegetable.

It is critical for the success of the present invention to heat the prepared vegetable, e.g. carrot dice, to case-harden the exterior surface, to remove a required amount of average moisture and to provide a different moisture level in the exterior surface and the interior portion. In this invention, the exterior surface is considered to be of finite thickness. The dice are case-hardened when the exterior surfaces are tough, but pliable, but the interior portions are still relatively soft. This tough surface will resist subsequent crushing pressure and will be substantailly undamaged except for perforations caused by the pressure of the interior portion being squeezed outwards. In contrast, the interior portions of the case-hardened dice will be mashed during the crushing operation.

During the case-hardening of the prepared vegetable, some of the original moisture is removed therefrom, i.e., at least about 5% of the original moisture. However, the case-hardened product must still have at least about 40% moisture. For example, carrot dice containing about 90% original moisture should have from about 40% to about 85%, preferably 50% to 75%, moisture after the heat treatment. These percentages are based on the average moisture for the whole dice. However, simple removal of moisture may not be suitable since the dice may have an inadequate differential in moisture content between their interior portions and exterior surfaces. It is important, therefore, to dehydrate the exterior surface quickly and to dehydrate the interior portion to a relatively small extent to provide the distinct contrast in toughness. In other words, the desired tough exterior surfaces and soft interior portions are formed by removing moisture rapidly in the case-hardening step from primarily the exterior surfaces of the carrot dice. To accomplish this result, the air temperature is usually between about 180° F. and 290° F., depending upon time, air velocity and type of drying apparatus. The dice are preferably moved frequently during this step to case-harden uniformly all the surfaces.

Carrot dice which are improperly case-hardened and/or very slightly dehydrated, for example, those obtained by reducing carrot dice having 90% original moisture to a moisture level of more than about 85%, are not suitable for this invention, i.e., only a minimum of moisture removed. If these carrot dice are gently crushed between rolls in a subsequent operation, the final dehydrated product does not reconstitute to the initial fresh dice shape on boiling in water for a reasonable time, i.e., about 15 minutes, and the reconstituted material has caved-in walls. If the carrot dice are severely crushed, they tend to break apart excessively, and the reconstituted product is shredded, irregularly shaped and has an excessively broken structure. Furthermore, juices are forced out of the carrot dice during the subsequent crushing step. These juices contain desired flavor bodies and other carrot solids, and they represent a loss in yield.

Carrot dice which have too much moisture removed during case-hardening, for example, where the moisture content is reduced from the original 90% level to about 20% moisture, are also not suitable for the present invention. A relatively high pressure is required in the crushing step, and the exterior surfaces, as well as the interior portions of the dice, are excessively damaged. Furthermore, actual breaking of the dice and overall disruption of their structures may occur during the crushing operation. The reconstituted product therefrom is full of fissures, cracks, etc.; generally unattractive in appearance; and also damaged.

The partially dehydrated, case-hardened vegetable piece, e.g., dice or julienne strips, of this invention are then treated to impart certain desired characteristics. The preferred treatment is crushing; however, other types of treatment to attain the same results may be suitable. This treating, e.g., crushing, step should follow the case-hardening with a minimum amount of delay to maintain the substantial differential in moisture content between the interior portions and exterior surfaces of the case-hardened dice; otherwise, the moisture within the dice may be in equilibrium and uniform throughout. During the crushing, the exterior surfaces of the dice remain intact; however, the pressure creates a definite perforation at one or more weak points in a surface of each of the dice. Although there must be at least one perforation, i.e., break in the surface, the number of perforations is kept to a minimum. The shape of the perforation may vary depending upon the type of crushed piece. For example, it may be roughly circular in dice or somewhat elongated in julienne strips. In any event, the perforated, crushed piece herein is not tantamount to a torn product having numerous tears in the exterior surface. The cell structures of the interior portion of the crushed piece are severely broken down, e.g., mashed.

To accomplish these results, the crushing may take place in any suitable equipment. The conditions for the crushing vary according to the size of the dice, their moisture content, the extent to which the dice were blanched and the like. However, rollers set 0.09 to 0.14 inch apart are preferred. The crushed vegetable piece, e.g., carrot dice, is generally flattened to a roughly rectangular shape; the flat surfaces show little or no damage while the ends appear to be ruptured. If, for example, part of the carrot core is present in one of the dice, the lighter-colored fibers thereof usually run parallel to the flattened darker orange surface of the carrot piece. In some instances, the flattening may be completely nonuniform, and the product has an irregular shape with random fissures.

As defined herein a treated piece, or, more specifically, a crushed piece, e.g., crushed dice and crushed julienne strips, has an average thickness of at least about 0.05 inch. As further defined herein a subsequently dehydrated piece also has an average thickness of at least 0.05 inch. A product crushed to the extremely small thickness of 0.01 inch or less, i.e., a flake, or crushed to a powder is not within the purview of this invention.

Dice made on commercial equipment are almost completely uniform in dimensions from piece to piece with cross-sections that are almost perfect squares or rectangles. Diced pieces made in home cooking circles may not have such perfect shapes and the cross-section may be even triangular in shape. Accordingly, a dehydrated diced product herein is generally a block having five or six main faces of regular or irregular shape with the smallest average linear dimension through the block being considerably longer than the thickness of a conventional food flake. The dehydrated dice may measure, for example, from ¼ inch to ½ inch along the longest dimensions and from 1/16 inch to 3/16 inch along the shortest dimensions. Similarly, a julienne strip may have a substantially rectangular cross-section with the length being much greater than the width if commercially prepared or the shape may be irregular if prepared by hand. A julienne strip may measure, for example, from 0.05 inch to 0.09 inch in thickness, from ⅛ inch to ¼ inch in width and from ¾ inch to 1 inch or more in length. Thus, the preferred forms of pieces in the present invention, i.e., dice pieces and julienne strips, are somewhat related; they both have shapes which, when rehydrated, are converted to products having the aforementioned cross sectional shape characteristics of diced foods.

The crushed vegetable piece is then finally dried to provide a dehydrated vegetable. A "dehydrated vegetable" is defined herein as a product having enough water removed to cause improved stability with respect to flavor, texture and bacterial decomposition. Therefore, it may have little water content, e.g., 5%, or an appreciable amount of water, e.g., 25%. Conventional hot air dehydration may be employed taking the usual precautions, e.g., scorching should be avoided.

During the final dehydration, the exterior case-hardened surface is relatively impervious to water evaporation and free water vapor is liberated in the mashed interior portion. This water vapor is channeled out through the one or several perforations in the exterior surface. Therefore, the material in the center of the vegetable piece dehydrates before the material around the periphery, i.e., below the case-hardened exterior surface. Consequently, shrinkage occurs from the inside toward the outside, and a hollow product is formed with one or more perforations in the exterior surface. As defined herein, hollow refers to a product in which the interior is not completely free of solid matter, i.e., one in which one or more void spaces appear.

This is the reverse of the shrinkage during normal hot air dehydration wherein the water from the inside goes through the surface. At the same time, water is evaporated off the surface at a faster rate and the surface becomes partially dry. The shrinkage, therefore, occurs from the outside towards the inside to form a caved-in product.

It is also within the purview of this invention to coat the vegetable with starch in order to retard changes in color and flavor during drying. The starch coating, which is generally applied before the case-hardening operation or after the crushing operation, does not affect subsequent reconstitution.

It is also possible to coat the vegetable with crystalline or non-crystalline sugar, e.g., sucrose and corn syrup, to retain more flavor. The vegetable may be dipped into a sugar solution or the sugar may be sprinkled onto its surface. This sugar coating is applied during any stage of the process of this invention, preferably before case-hardening or after crushing. If applied to the crushed material, the uptake is quicker since more surface is exposed; this uptake, however, may take place without any dehydrating effect. Accordingly, the vegetable may have both a sugar and a starch coating or either one alone.

Thus, in accordance with this invention, a new dehydrated root vegetable has been provided. The dehydrated piece, e.g., carrot dice, is hollow and shrunk from the inside to the outside. The instant dehydrated vegetable, if boiled in water, reconstitutes in a relatively short time, i.e., about 15 minutes or less. Furthermore, the size of the reconstituted product is about the same size as the original piece with the hollow inside being filled. The reconstituted product has good flavor and is tender and plump.

The following examples are submitted to illustrate but not to limit this invention.

*Example 1*

Fifty pounds of long, California-grown Imperator carrots were prepared for dehydration by peeling, washing, dicing them into ⅜ inch cubes, blanching for 7 minutes at 200° F. using flowing steam, and dipping in a 2.5% starch solution. The prepared dice were case-hardened and partially dehydrated to a moisture content of 70% by heating at 195° F. for 35 minutes with the air at high velocity through a 1 inch-layer bed. The case-hardened dice were then crushed by passing them between two rolls which were separated by 0.13 inch and heated at 140° F. The crushed dice were further dehydrated for ¾ hr. at 160° F. with medium air velocity through a ¾ inch drying bed and subsequently dehydrated for 16 hours in an air oven at 120° F. The moisture content of the dehydrated carrot dice was 5%.

Seventy grams of these dehydrated carrot dice were added to 2 cups of water containing ½ tsp. salt; brought to a boil; simmered for 15 minutes; and drained. The reconstituted vegetable had approximately the same size as the vegetable in the initial raw state. Texture, color, and flavor of the reconstituted product were good.

Conventional dehydrated carrot dice having the same initial size were similarly cooked. However, the reconstituted dice were hard and rubbery. The sides were concave rather than flat, which indicated incomplete hydration.

It is manifest from the above that a superior dehydrated product is provided in accordance with this invention.

*Example II*

Fresh carrots were peeled, washed, diced into ⅜ inch cubes, blanched for 7 minutes in flowing steam, and dipped for 15 seconds in 0.2% sulfite solution. Samples A, B, C and D were removed from this prepared batch and then case-hardened to different moisture levels or not case-hardened at all, as follows:

Sample A with 87% moisture was crushed between rolls 0.2 inch apart without being case-hardened. The dice had too much moisture and too little elasticity, and had to be pushed through the rolls. Many of the dice were sheared apart during rolling. The rolled dice were then dehydrated at 165° F. for 1 hour and subsequently at 125° F. for 17 hours to a final moisture content of 5%.

Sample B was case-hardened for 14 minutes at 190° F. with updraft air at 200 ft./min. to 82.5% moisture. This air velocity of 200 ft./min. was employed in all the examples where the vegetables was case-hardened. The case-hardened sample B was crushed thereafter with rolls 0.13 inch apart. The rolled dice were finally dried, as described for sample A, to 4.5% moisture.

Sample C, after 24 minutes of case-hardening under the aforementioned conditions for sample B, had 72.3% moisture. The subsequent crushing operation with the rolls 0.11 inch apart was conducted without difficulty. The crushed dice were finally dried, as per sample A, to a moisture content of 4.5%.

The sample D which had 37.1% moisture after 54 minutes of similar case-hardening conditions was crushed with the rolls 0.05 inch apart. Although rolling was possible, it caused excessive rupturing and structural damage. The rolled material was finally dehydrated, as described for sample A, to 5% moisture.

Dehydrated samples A, B, C and D were then reconstiuted in accordance with the procedure described in Example I. The results were as follows:

Sample A reconstituted to an edible state in 17 minutes but still had concave sides and a shriveled appearance.

Sample B reconstituted in 14 minutes, had flat sides and had some structural damage, but it was acceptable and was distinctly superior to sample A.

Sample C reconstituted in 13 minutes, showed no concavity, and had insignificant apparent damage.

Sample D reconstituted in 15 minutes but had partial disintegration and showed excessive damage.

The example demonstrates the criticality of the case-hardening step. If the vegetable dice are not case-hardened or if the dice are case-hardened with only a very slight moisture loss, an inferior dehydrated product is formed. A commercially unsuitable dehydrated vegetable is also provided if too much moisture is removed from the dice during the case-hardening operation.

*Example III*

Fresh carrots were peeled, washed, diced into ⅜ inch cubes, and blanched for 7 minutes in flowing steam at atmospheric pressure. The blanched carrots were dipped for 15 seconds in a 0.2% sulfite ($NaHSO_3$) solution. The dipped dice were then case-hardened in 35 minutes with updraft air at 190° F. and 200 ft./min. velocity to a moisture content of 65%.

The case-hardened dice were subsequently crushed with rolls 0.09 inch apart. The rolled dice were impregnated with 60% sucrose solution (10 g. of sucrose solution for every 100 g. of rolled dice) in a V-type blender for 15 minutes. The impregnated dice were then dehydrated for 1.5 hours at 150° F. and 16 hours at 120° F. The final moisture content was 4.5%.

The dehydrated dice were reconstituted in 15 minutes following the procedure of Example I. The reconstituted dice had good carrot flavor, texture and practically no concavities.

*Example IV*

Fresh carrots were prepared for dehydration by peeling, washing, dicing into ⅜ inch cubes, blanching for 7 minutes in flowing steam at atmospheric pressure and dipping for 15 seconds in 0.2% $NaHSO_3$. The dice were case-hardened with updraft air for 35 minutes at 190° F. and 200 ft./min. velocity. The carrot dice, with 65% moisture therein, were subsequently crushed with rolls 0.09 inch apart. The crushed dice were impregnated with 65% 42 dextrose equivalent corn syrup solution (20 g. for 100 g. of carrots) in a V-type blender for 15 minutes. After this impregnation, dice were dehydrated for 1.5 hours at 150° F. and subsequently for 16 hours at 120° F. to 4.5% moisture content.

The dehydrated product was reconstituted in 15 minutes following the procedure of Example I. The reconstituted dice had good flavor, texture and hardly any concavities.

*Example V*

Fresh carrots were prepared for dehydration in the same manner described in Example IV. The prepared carrot dice were case-hardened in 12 minutes with updraft air at 250° F. and 200 ft./min. air velocity. The average moisture content in the case-hardened dice was 76.8%.

The dice were subsequently forced with a minimum of delay between 2 rolls which were 12 inches in diameter, 0.13 inch part and heated at 140° F. The rolls were rotated towards each other at a speed of one revolution per minute. The crushed dice therefrom were dipped in a 60% sucrose syrup for one minute, drained, and air dried in a cabinet drier for 2 hours at 150° F. and subsequently for 16 hours at 125° F. The final moisture in the dice was 4.7%.

The dehydrated dice were cooked in boiling water for 15 minutes and the reconstituted product therefrom was tender, plump, and had good carrot flavor.

Examples III, IV and V show that a dehydrated carrot impregnated with a sucrose or corn syrup solution has excellent carrot flavor upon reconstitution.

*Example VI*

Fresh sweet potatoes, about 70% original moisture, were peeled, cut into ⅜ inch x ⅜ inch x ⅜ inch dice, blanched, sulfited and case-hardened with partial drying to 65% moisture in a Proctor & Schwartz tray drier operating at 165° F. with maximum air velocity. The case-hardened, partially dried dice were subsequently passed through rolls (1 ft. diameter) which were set 0.14 inch apart and which were rotated very slowly. The crushed item therefrom was heated for 2 hours at 165° F. and subsequently for 17 hours at 120° F. to a final moisture content of 4.8%.

A control product was similarly prepared, except that the case-hardened and crushing operations were omitted. After reconstitution in boiling water for 15 minutes, the control product was only partially dehydrated; its sides were caved-in; and its interior texture was dry and incompletely cooked.

Conversely, the case-hardened and crushed diced piece after similar reconstitution, was completely rehydrated. It was moist; its sides were squared off as in the original, undried material; and its flavor was good.

*Example VII*

Turnips, about 90% original moisture, were washed, peeled, trimmed, and cut into 3/8 inch dice. The dice were blanched 7 minutes in steam at 210° F., dipped in a 0.2% NaHSO$_3$ solution for 10 sec., and then placed on trays in a Proctor & Schwartz drier. The dice were subjected to fast flowing air at 170° F. for 40 minutes, to case-harden and to dehydrate partially to an estimated moisture content of about 65%. The case-hardened product was then run between rolls as per Example VII. The resultant crushed material was subsequently dehydrated in air at 120° F. to 5% moisture.

The dehydrated product was fully reconstituted to its original shape after 12 minutes in boiling water. The flavor of the material was good, and its texture was acceptable.

A control product was similarly prepared, except that the case-hardening and crushing operations were omitted.

The control did not completely rehydrate even in 20 minutes. Some of the dice in the control had caved-in sides after this 20 minutes period.

*Example VIII*

Fresh Irish potatoes, about 80% original moisture, were washed, peeled, trimmed, and cut into 3/8 inch dice. These dice were blanched 6 minutes in steam at 210° F.; dipped for 6 seconds in a solution containing 0.5% citric acid, 0.25% Na$_2$SO$_3$ and 0.25% NaHSO$_3$; and drained. The resultant material was case-hardened and partially dehydrated to an estimated moisture content of about 65% by being subjected to high velocity air at 165° F. for 1 hour. After subsequent crushing with rolls set 0.14 inch apart, the dice were finally dried to 2.5% moisture by heating for 3 hours at 160° F. and then for 17 hours at 120° F.

The dehydrated dice reconstituted in 5 minutes in boiling water. The texture of the rehydrated product was good, and the flavor was excellent.

The cooked dice were mashed subsequently with a fork. The mashed potatoes therefrom had excellent texture and flavor and were like home-prepared mashed potatoes with respect to both qualities.

Having set forth the general nature and specific embodiments of the present invention, the true scope is now particularly pointed out in the appended claims.

What is claimed is:
1. A process for forming a dehydrated root vegetable piece which comprises preparing and cutting as required a root vegetable for dehydration; heating said prepared vegetable to case-harden its surface, to remove at least about 5% of the original moisture but to provide an average moisture content of at least 40% and to form a differential moisture level in its exterior surface and in its interior portion; pressing said casehardened, partially dehydrated vegetable with a minimum amount of delay to break down severely the cellular structure of its interior portion without damaging substantially the exterior surface except for a minimum amount of, but at least one, perforations therein; and drying the treated piece therefrom to provide a dehydrated product.

2. The process according to claim 1 in which the dehydrated root vegetable piece is a dehydrated diced piece.

3. The process according to claim 1 in which the dehydrated root vegetable piece is a dehydrated julienne strip.

4. A process for forming a dehydrated carrot piece which comprises peeling, washing, cutting, sulfiting and blanching a carrot to form a product prepared for dehydration; heating said prepared carrot to case-harden its surface, to form a differential moisture level in its exterior surface and in its interior portion and to reduce the moisture level to about 40% to about 85%; crushing said case-hardened, partially dehydrated carrot with a minimum amount of delay to break down severely the cellular structure of its interior portion without damaging substantially the exterior surface except for a minimum amount of, but at least one, perforations therein; and drying the crushed carrot piece therefrom to provide a dehydrated product.

5. The process according to claim 4 in which the dehydrated carrot piece has at least one coating thereon selected from the group consisting of a starch coating, alone; a sugar coating, alone; and both a starch coating and a sugar coating.

6. The process according to claim 4 in which the dehydrated carrot piece is capable of being reconstituted in a maximum time of 15 minutes to a product having about the same size as said prepared carrot; having good flavor; and being tender and plump.

7. A process for forming dehydrated carrot dice pieces which comprises peeling, washing, dicing into 3/8 inch cubes, blanching for 7 minutes in flowing steam and dipping for 15 seconds in a 0.2% sulfite solution fresh carrots to form a product that is prepared for dehydration; heating said prepared carrot diced product for 14 minutes at 190° F. with updraft air at 200 ft./min. to case-harden its surface, to form a differential moisture level in its exterior surface and its interior portion and to reduce the moisture level to 72.3%; crushing said case-hardened, partially dehydrated carrot diced product with a minimum amount of delay with rolls set 0.11 inch apart to break down severely the cellular structure of its interior portion without damaging substantially its exterior surface except for a minimum amount of, but at least one, perforations therein; and drying the crushed carrot diced piece therefrom at 165° F. for one hour and subsequently at 125° F. for 17 hours with shrinkage occurring from the inside towards the outside to provide a dehydrated product with a moisture content of 4.5%.

References Cited by the Examiner

UNITED STATES PATENTS

| | | | |
|---|---|---|---|
| 2,619,424 | 11/1952 | Masure | 99—204 |
| 2,882,609 | 4/1959 | Templeton | 99—204 |

OTHER REFERENCES

Eisenhart, N. H., et al.: "Quick Cooking Dehydrated Vegetable Pieces," Food Technology, 1962, vol. XVI, No. 5, pp. 143 to 146.

Molaison, L. J. et al.: "Dehydrated Diced Sweet Potatoes," Food Technology, 1962, vol. XVI, No. 11, pp. 101 to 104.

A. LOUIS MONACELL, *Primary Examiner.*

R. S. AULL, *Assistant Examiner.*

UNITED STATES PATENT OFFICE
CERTIFICATE OF CORRECTION

Patent No. 3,295,995        January 3, 1967

Willard M. Bright et al.

It is hereby certified that error appears in the above numbered patent requiring correction and that the said Letters Patent should read as corrected below.

Column 1, line 71, for "ti" read -- it --; column 5, line 45, for "vegetables" read -- vegetable --; column 6, line 36, for "65%" read -- 60% --; line 54, for "part" read -- apart --; column 7, line 6, for "case-hardened" read -- case-hardening --; line 8, for "dehydrated" read -- rehydrated --.

Signed and sealed this 26th day of September 1967.

(SEAL)
Attest:

ERNEST W. SWIDER
Attesting Officer

EDWARD J. BRENNER
Commissioner of Patents